United States Patent [19]

DeBruine et al.

[11] Patent Number: 4,960,553

[45] Date of Patent: Oct. 2, 1990

[54] METHOD FOR FORMING ARTICLES HAVING DEEP DRAWN PORTIONS FROM MATTED WOOD FLAKES

[75] Inventors: Gordon R. DeBruine, Tacoma, Wash.; Bruce A. Haataja, Lake Linden; L. Bogue Sandberg, Chassell, both of Mich.

[73] Assignees: Board of Control Michigan Technological University, Houghton, Mich.; Weyerhaeuser Co., Tacoma, Wash.

[21] Appl. No.: 478,834

[22] Filed: Feb. 12, 1990

[51] Int. Cl.[5] ...................... B65D 19/31; B29C 43/18; B32B 31/04

[52] U.S. Cl. .................................... 264/113; 108/51.1; 108/53.3; 108/901; 264/119; 264/258; 264/320

[58] Field of Search ............... 264/113, 119, 258, 293, 264/320; 108/901, 53.3, 51.1

[56] References Cited

U.S. PATENT DOCUMENTS 4,061,813 12/1977 Geimer et al. ...................... 428/183
4,248,163 2/1981 Caughey et al. .................. 108/53.3
4,408,544 11/1983 Haataja ............................ 108/53.3
4,440,708 4/1984 Haataja et al. ...................... 264/109
4,790,966 12/1988 Sandberg et al. ..................... 264/39

*Primary Examiner*—Mary Lynn Fertig Theisen
*Attorney, Agent, or Firm*—Michael, Best & Friedrich

[57] ABSTRACT

An article having non-planar portions, such as a material handling pallet, including a substantially flat deck member and a plurality of hollow leg members projecting integrally from the deck member, is molded as a one-piece unit from a loosely-felted mat formed from a mixture of resinous particle board binder and flake-like wood particles. The leg members are preformed in a separate preform mold or the article forming mold and the mat is deposited on the female die over mold cavities containing the preforms. When the article forming mold is closed, the mat and preforms are compressed into substantially the desired shape and size under temperature and pressure conditions which bond the wood particles of the mat and the preforms together to form a unitary structure.

17 Claims, 1 Drawing Sheet

METHOD FOR FORMING ARTICLES HAVING DEEP DRAWN PORTIONS FROM MATTED WOOD FLAKES

BACKGROUND OF THE INVENTION

The present invention relates to articles molded from flake-wood particles, such as pallets for use in material handling, and having at least one non-planar portion displaced from a major plane and, more particularly, to methods for making such articles.

Considerable effort has been devoted to developing techniques for molding articles including non-planar portions from an inexpensive residue and surplus woods. One area of particular interest for utilizing such woods is in the production of material handling pallets.

In one method of molding such pallets, a loosely-felted mat formed from a mixture of flake-like wood particles and a binder or so-called furnish is deposited on the lower or female die of a pallet-forming mold including a plurality of cavities which form the legs for the pallet. The upper or male die of the mold extrudes the wood particles downwardly into the leg-forming cavities during compression of the mat. Such a method is disclosed in U.S. Caughey et al Pat. No. 4,248,163, U.S. Haataja et al Pat. No. 4,408,544 and U.S. Haataja et al Pat. No. 4,440,708.

When the legs are longer and/or intricately designed, the mat material may be pulled apart to form voids which can cause localized weak spots as well as rough spots in the surface which affects the appearance of the pallet. FIGS. 5–7 of U.S. Haataja et al Pat. No. 4,440,708 illustrate different techniques for alleviating this difficulty. In one technique, the leg-forming cavities in the female die are substantially filled with furnish and a loosely-felted mat formed outside the mold is deposited on the female die over the filled cavities prior to closing the mold. In another technique, a loosely-felted mat is formed outside the mold and mounds of furnish are deposited on top of the mat at the locations corresponding to the female die cavities prior to placing the mat in the mold. In another technique, a mat is loosely felted directly onto the female mold and the cavities are filled with furnish during mat formation.

U.S. Sandberg et al Pat. No. 4,790,966 discloses still another technique in which the leg-forming cavities in the female die are filled with furnish and a two-layer, loosely-felted mat is deposited thereover. The wood particles in both layers of the mat are generally parallel aligned and those in one layer extend transversely to those in the other layer. This patent also discloses the use of a separate caul sheet which has a shape corresponding to the female die and is supported by the female die during formation of the pallet. The furnish and double-layered mat is deposited on the caul sheet and the caul sheet is inserted into the female die for a molding.

These prior methods for forming relatively long or intricately designed legs involve either several expensive processing steps and/or a separate caul sheet including leg-forming cavities which is quite expensive to fabricate.

SUMMARY OF THE INVENTION

The principal object of the invention is to provide an improved method for forming an article, such as a material handling pallet, having a main body defining a major plane and a non-planar portion displaced from the major plane, the main body and the non-planar portion being molded as a one-piece unit from low cost woods.

Another object of the invention is to provide a method for forming material handling pallets from low cost woods having deep drawn and/or intricately designed legs with acceptable strength characteristics and a smooth appearance.

A further object of the invention is to provide such a method for molding material handling pallets which does not require a separate caul including leg-forming cavities.

Other objects, aspects and advantages of the invention will become apparent to those skilled in the art upon the reviewing the following detailed description, the drawing and the appended claims.

The invention provides a method for forming an article having a major plane and at least one non-planar portion displaced from the major plane including the steps of admixing a resinous particle binder with flake-like wood particles to produce a furnish, forming a preform of the non-planar portion from the furnish, with the preform located in the cavity of an open part of an article-forming mold including separable parts defining a mold chamber having the shape of the article, depositing a loosely-felted mat formed from the furnish on the open part of the article-forming mold over the cavity in which the preform is located, and closing the article-forming mold and applying sufficient heat and pressure on the mat and the preform to compress them into substantially the desired size and shape of the article and to bond the wood particles of the mat and the preform together to form a unitary structure.

In the manufacture of pallets, the pallet-forming mold has a female die including cavities for forming hollow leg members and a complementary male die. Preforms of the leg members can be formed in a separate preform mold and transferred from that mold to the leg member-forming cavities in the female die of the pallet-forming mold before the mat is deposited on the female die. The binder in the furnish used to form to preforms preferably has a relatively high tackiness at ambient temperatures so that the leg members can be preformed in an unheated preform mold and have sufficient strength to retain their shape during transfer from the preform mold to the pallet-forming mold. Alternately, the preforms can be formed directly in the leg member-forming cavities of the pallet-forming mold by depositing a predetermined amount of furnish in each cavity, momentarily closing the mold, opening the mold, depositing the mat on the female die over the leg member-forming cavities containing the preforms and closing the mold again. In this case, the binder in the furnish for both the preform and the mat can be a conventional resinous particle board binder.

DESCRIPTION OF THE PREFERRED EMBODIMENTS

The invention relates broadly to forming one-piece articles from wood flakes, particularly support members, including a main body having a major plane and non-planar portion displaced from that major plane. The invention is particularly adaptable to forming material handling pallets and will be described in connection with that application.

Figure 1:
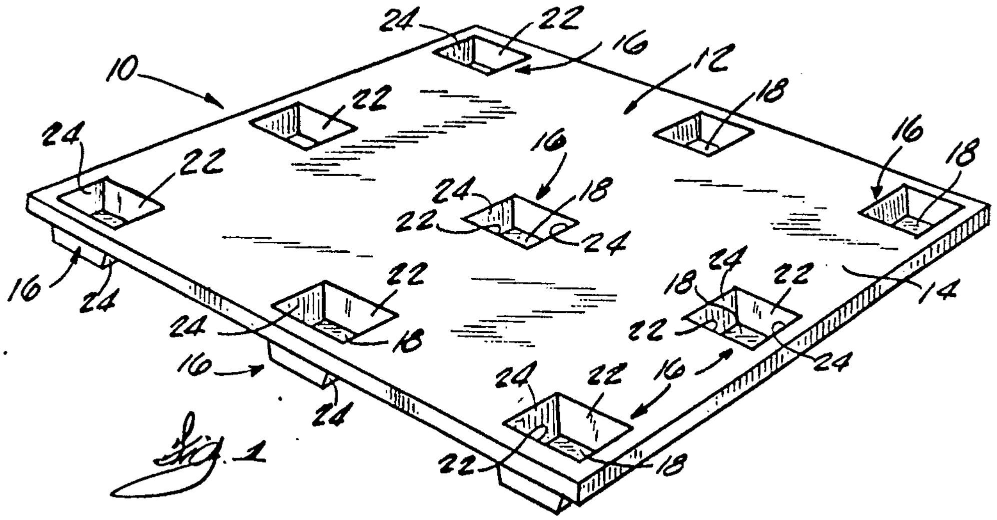
FIG. 1 is a perspective view of a material handling pallet produced by the method of the invention.
Figure 2:
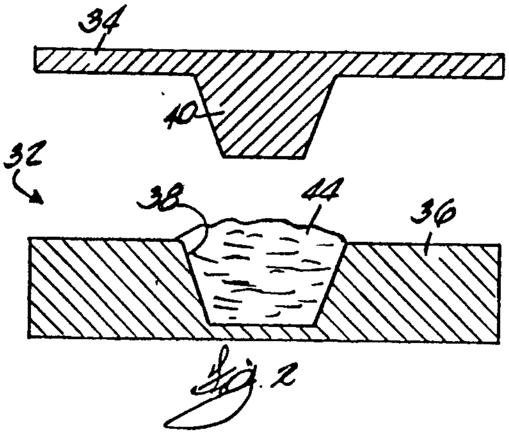
FIG. 2 is a diagrammatic representation of a preform mold shown with the male and female dies separated and a cavity in the female die filled with furnish.

Illustrated in FIG. 1 is a material handling pallet 10 produced by the method of the invention. The pallet 10 includes a generally flat, rectangular deck member 12 having a substantially uniform wall thickness and flat upper surface 14 which serves as a supporting or main plane. Projecting downwardly from the deck member 12 is a plurality of non-planar, hollow leg members 16 adapted to serve as supporting pads for the pallet 10. In a specific construction illustrated, each of the leg members 16 includes a bottom wall 18 having a flat bottom surface and two opposed pairs of flat side walls 22 and 24. The bottom surface of the bottom wall 18 is spaced from the bottom surface of the deck member 12 a sufficient distance to permit entry of the tines of a fork lift beneath the deck member 12. The deck member 12 the leg members 16 are molded as a unitary structure or one-piece unit from a mixture of a suitable resinous particle board binder and flake-like wood particles as described below. The side walls 22 and 24 of the leg members 16 are inclined or tapered to facilitate molding and to also permit nesting of several pallets into a compact stack so as to minimize the space required for shipment and storage. In the specific construction illustrated, the side walls 22 and 24 are substantially flat and the leg members 16 have the general form of an inverted, truncated, hollow pyramid. If desired, the leg members 16 can be formed with other suitable cross sectional shapes, e.g., in the form of an inverted, truncated, hollow cone.

As disclosed in U.S. Haataja et al Pat. No. 4,440,708, which is incorporated herein by reference, production of the pallets 10 generally includes the step of comminuting small logs, branches or rough pulpwood into flake-like particles, drying the wood particles to a predetermined moisture content, classifying the dried flakes to obtain wood particles having a predetermined size distribution, admixing predetermined quantities of a suitable resinous particle board binder, and optionally a liquid wax composition, with the dried and sized flakes, forming the resultant mixture of binder, wood flakes and wax or furnish into preforms of the leg members, with the preforms located in the leg member-forming cavities of a pallet-forming mold including separable male and female dies defining a mold chamber having the desired shape of the pallet, placing a loosely-felted, layered mat (single or multi-layers) formed from the furnish on the female die and covering the cavities containing the leg member preforms, closing the mold and applying sufficient pressure to compress the mat and the preforms into substantially desired shape and size of the pallet, removing the molded pallet from the press and trimming the peripheral edges of the pallet with a power saw or the like to the desired final dimensions. The leg member preforms can be formed either in a separate preform mold or in the pallet-forming mold.

The wood flakes can be prepared from various species of suitable hard woods and soft woods used in the manufacture of particle board. Representatives examples of suitable woods include aspen, maple, oak, elm, balsam fir, pine, cedar, spruce, locust, beech, birch and mixtures thereof.

Suitable flake-like particles can be prepared by conventional techniques such as those described in U.S. Haataja et al Pat. No. 4,440,708.

The size and distribution of the wood particles can be within the ranges described in U.S. Haataja et al Pat. No. 4,440,708. The wood particles can have an average length of about 1.25 to about 6 inches, preferably about 2 to about 3.5 inches, an average width of about 0.125 to about 2 inches and an average thickness of about 0.005 to about 0.075 inch, preferably about 0.025 to about 0.030 inch, and are classified to remove material which passes a $\frac{1}{4}$ inch screen. In applications where a more intricate leg member design, longer leg members and/or a smoother surface is desired, up to about 75%, preferably about 25%, of the wood particles can be finer, i.e., pass a $\frac{1}{4}$ inch screen but retained on a $\frac{1}{8}$ inch screen.

Flakes from some green woods can contain up to 90% moisture. The moisture content of the furnish used for forming the preforms and the mat must be substantially less. Also, wet flakes tend to stick together and complicate classification and handling prior to blending. Accordingly, the flakes preferably are dried prior to classification in a conventional type dryer to a moisture content desired for the blending step. The moisture content to which the flakes are dried usually is order of about 6 weight % or less, preferably about 2 to about 5 weight %, based on the dry weight of the flakes.

A known amount of the dried, classified flakes is introduced into a conventional blender, such as a paddle-type batch or drum blender, wherein a predetermined amount of a resinous particle binder, and optionally a wax and other additives, is applied to the flakes as they are tumbled or agitated in the blender. Suitable binders include those used in the manufacture of particle board and similar pressed fibrous products and, thus, are referred to herein as "resinous particle board binders."

The binder in the furnish for the leg member preforms and the mat can be the same, particularly when the preforms are formed in the pallet-forming mold. When the preforms are formed in a separate preform mold, the binder in the furnish for the preforms preferably is formulated so it has relatively high tackiness at near or room temperature. Suitable binders capable of providing high tack include thermosetting resins such as urea-formaldehyde, phenol-formaldehyde and urea-phenol formaldehyde. However, other conventional resinous particle board binders, such as thermosetting binders and organic polyisocyanates, either alone or combined with urea- or melamine-formaldehyde resins, can be used, particularly when the preforms are formed in a heated mold.

In the specific embodiment illustrated in FIGS. 2–5, preforms 30 of the leg members 16 are molded in a separate preform mold 32 having a movable male die 34 and a stationary female die 36 including a plurality of cavities 38 (one shown), each of which defines or at least approximates the exterior of a leg member 16. The male die 34 includes a plurality of complementary protuberances 40 (one shown), each of which defines or at least approximates the interior of a leg member 16.

Thus, the cavities 38 and the protuberances 40 cooperate to define a mold chamber 42 for a preform 30.

With the male die 34 in an open position (FIG. 2), a predetermined quantity of furnish 44 is deposited in each female die cavity 38. The male die 34 is closed (FIG. 3) and the furnish 44 is compressed down into each cavity 38 to press the wood particles into intimate contact with each other and form a preform 30 of a leg member 16.

Figure 3:
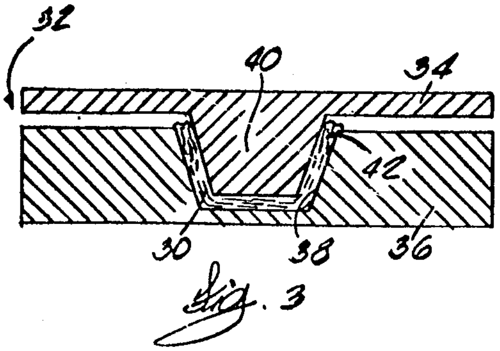
FIG. 3 is a diagrammatic representation similar to FIG. 2 with the preform mold closed to form a leg member preform.
Figure 5:
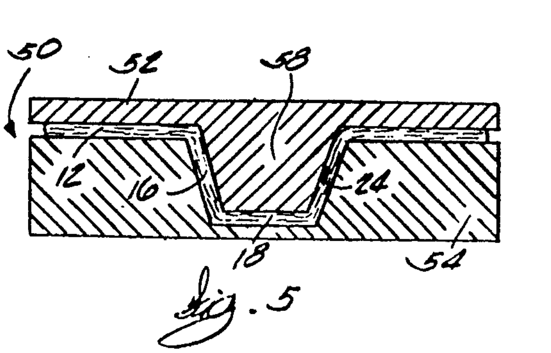

The side walls of the preform 30 usually do not extend the full height of the cavity 38, but can extend the full length cavity and even beyond as shown in FIG. 3. The cavities 38 and protuberances 40 preferably are arranged so that they are substantially duplicates of the mold used to form the pallet and the preforms 30 are substantially duplicates of the final leg members 16, except that the side walls can be somewhat shorter or longer. However, the preforms 30 need only approximate the final configuration of the leg members 16.

The preform mold 32 preferably is at room temperature when the preforms 30 are molded. The molding pressure and time to form the preforms 30 varies depending on the size and type of wood flakes, the moisture content of the furnish and the type of binder used. The molding pressure should be sufficient to press the wood particles into sufficient contact with each other so that the tackiness of the binder make the preforms substantially self supporting. Generally, the molding pressure can range from about 200 to about 1000 psi.

The mold time can be quite short because there should be as little curing of the binder as possible during formation of the preforms. This time varies depending upon the preform molding pressure and temperature used and generally can be instantaneous up to about 20 seconds. The strength of preforms increases with an increase in the mold time. Accordingly, the mold time can be increased when stronger preforms are desired.

Figure 4:
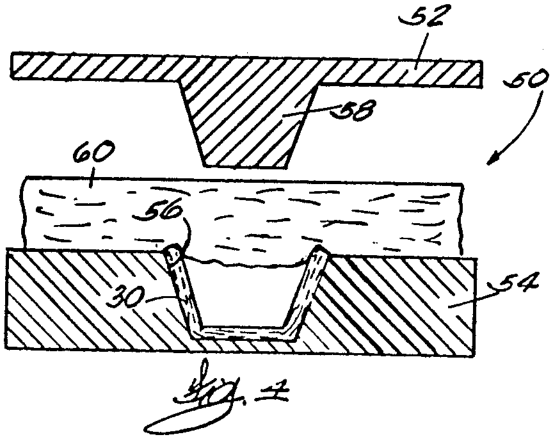
FIGS. 4 and 5 are diagrammatic representations of a portion of a pallet-forming mold respectively showing the mold open with a leg member preform and the mat in place and the mold closed for formation of a pallet.

The preforms 30 are transferred from the preform mold 32 to a pallet-forming mold 50 (FIG. 4). The preforms 30 can be transferred with a suitable caulless system or, if a caul used, it can be a flat sheet with cutouts for the preforms 30. The pallet-forming mold 50 includes a movable die 52 and a stationary die 54 which cooperate to define a mold chamber having the shape of the pallet 10. The female die 54 includes a plurality of cavities 56 (one shown), each of which defines the exterior of a leg member 16. The male die 52 includes a plurality of complementary protuberances 58 (one shown), each of which defines the interior of a leg member 16. The preforms 30 are placed in the female die cavities 56 and a loosely-felted mat 60 formed from the furnish is deposited on the female die 54 over the cavities 56 and the preforms 30.

The binder in the furnish for the mat preferably is a conventional particle board binder with normal tackiness. However, it can be the same as that used in the furnish for the preforms when only one blender is available.

The mat 60 can be formed on a carrier outside the pallet-forming mold 50 in a suitable manner, such as by the technique described in U.S. Haataja et al Pat. No. 4,440,708, then transferred from the carrier to the female die 54 after the preforms 30 have been placed in the leg member-forming cavities 56. As illustrated in FIG. 4, the mat 60 bridges over the cavities 56.

As the male die 52 is moved toward the closed position, the protuberances 58 pierce completely or partially through the mat 60 in the area of the cavities 56. The overhanging material is pressed into the side walls of the cavities 56 and pressed into intimate contact and becomes integrated with the upper portion of the preforms 30 to form a unitary leg member 16. The wood particles in other portions of the mat 60 are compressed into the desired size and shape of the pallet and substantially all the wood particles are bonded together to form a unitary structure.

During the formation of deep drawn leg members with prior art processes, considerable strain is placed on the mat in the areas surrounding the leg member-forming cavities 56 as the material is pulled or drawn down into the cavities. Since the preforms 30 make up at least a substantial portion of a leg member 16, a smaller amount of material in the mat outside the area of the cavities must be moved to form the leg members 16. The reduced strain on the mat results in the side walls of the leg members having superior appearance and strength characteristics.

The molding temperature, pressure and time for forming the pallet can be within the ranges described in U.S. Haataja et al Pat. No. 4,440,708.

If desired, the preforms can be formed in the pallet-forming mold 50 by depositing furnish directly into the female die cavities 56 and momentarily closing the male die 52 before the mat 60 is placed on the female die 54. When this approach is used, the binder in the furnish does not have to have a high tackiness and can be the same as that in the furnish for the mat, e.g., a conventional resinous particle board binder.

Generally, the pressure for molding the preforms can be the same as that used for molding the pallet. The pallet-forming mold 50 usually is preheated in order to reduce the molding or press cycle. Consequently, the molding or press cycle for formation of the preforms 30 and installation of the mat 60 must be fast enough to prevent substantial precuring of the binder prior to the final molding step.

While the invention has been described in connection with molds which produce recessed draws, it should be understood that it be used with molds which produce raised draws. In that case, preforms can be positioned at appropriate locations on the mat while it is outside the pallet-forming mat.

From the foregoing description, one skilled in the art can easily ascertain the essential characteristics of the invention and, without departing from the spirit and scope thereof, make various changes and modifications to adapt the invention to various uses and conditions.

We claim:

1. A method for forming an article having a major plane and at least one non-planar portion displaced from the major plane, said method including the steps of:

(a) admixing a resinous particle board binder with flake-like wood particles to produce a preform furnish;

(b) forming a preform of only said non-planar portion from said preform furnish;

(c) admixing a resinous particle board binder with flake-like particles to produce a mat furnish;

(d) with said preform located in a cavity in an open part of an article-forming mold including separable parts defining a mold chamber having the shape of the article, depositing a loosely-felted mat formed from said mat furnish on the open part of the article-forming mold and over the cavity in which said preform is located; and (e) closing the article-forming mold and applying sufficient heat and pressure on said mat and said preform to compress them into substantially the desired shape and size of the article and to bond the wood particles of said mat and said preform together to form a unitary structure.

2. A method according to claim 1 wherein said article is a pallet having a deck member including a major plane and a non-planar portion comprising a plurality of hollow leg members projecting integrally from said deck member, each of said leg members having a bottom wall spaced from said deck member and side walls integrally connecting said bottom wall to said deck member.

3. A method according to claim 1 wherein said preform is formed in a preform mold separate from the article-forming mold and is transferred to the article-forming mold prior to step (c).

4. A method according to claim 3 wherein said preform mold is unheated.

5. A method according to claim 4 wherein said binder in said preform furnish has a relatively high tackiness at ambient temperature.

6. A method according to claim 3 wherein the pressure applied to said mixture during formation of said preform is about 200 to about 1000 psi.

7. A method according to claim 2 wherein up to about 75% of said wood particles in said mixture pass a ¼ inch screen and are retained on a ⅛ inch screen.

8. A method according to claim 2 wherein said wood particles have an average length of about 1.25 to about 6 inches, an average width of about 0.125 to about 2 inches and an average thickness of about 0.005 to about 0.075 inch.

9. A method according to claim 1 wherein a preform is formed in a cavity of the article-forming mold by depositing a predetermined quantity of said preform furnish in the cavity with the article-forming mold open and then momentarily closing the article-forming mold; and after the article-forming mold is subsequently opened, said mat is deposited on the open part of the article-forming mold over the cavity in which said preform has been formed.

10. A method according to claim 9 wherein the article-forming mold is preheated and is momentarily closed to form said preform for a time period which does not cause substantial precuring of the binder.

11. A method according to claim 9 wherein said preform furnish and said mat furnish include the same binder.

12. A method for molding a material handling pallet having a deck and a plurality of hollow leg members projecting integrally from the deck member, each leg member having a bottom wall spaced from the deck member and side walls integrally connecting the bottom wall to the deck, said method including the steps of:

(a) admixing a resinous particle board binder with flake-like wood particles to produce a preform furnish;

(b) forming preforms of said leg members from said preform furnish;

(c) admixing a resinous particle board binder with flake-like wood particles to produce a mat furnish;

(d) with said leg member preforms located in leg member-forming cavities in a pallet-forming mold including separable male and female dies defining a mold chamber having the shape of the pallet, depositing a loosely-felted mat formed from said mat furnish on the female die and covering the cavities containing said preforms; and (d) closing the pallet-forming mold and applying sufficient heat and pressure on said mat and said preforms to compress them into substantially desired shape and size of the pallet and to bond the wood particles of said mat and said preforms together to form a unitary structure.

13. A method according to claim 12 wherein said preforms are formed in a preform mold separate from the pallet-forming mold and are transferred to the pallet-forming mold prior to step (c).

14. A method according to claim 13 wherein said preform mold is unheated; and said binder in said preform furnish has a relatively high tackiness at ambient temperatures.

15. A method according to claim 13 wherein the pressure applied to said mixture during formation of said preforms is about 200 to about 1000 psi.

16. A method according to claim 12 wherein said preforms are formed in the leg member-forming cavities of the pallet-forming mold by depositing a predetermined quantity of said preform furnish in the leg member-forming cavities and then momentarily closing the pallet-forming mold; and after the pallet-forming mold is subsequently opened, said mat is deposited on the female die of the pallet-forming mold and over the cavities containing said preforms.

17. A method according to claim 16 wherein said preform furnish and said mat furnish include the same binder.

* * * * *